(12) United States Patent
Sugiyama

(10) Patent No.: US 9,678,404 B2
(45) Date of Patent: Jun. 13, 2017

(54) OPTICAL MODULE AND TRANSMITTING DEVICE

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/703,411

(22) Filed: May 4, 2015

(65) Prior Publication Data

US 2015/0362823 A1    Dec. 17, 2015

(30) Foreign Application Priority Data

Jun. 12, 2014   (JP) .................. 2014-121853

(51) Int. Cl.
  *G02F 1/035* (2006.01)
  *G02F 1/225* (2006.01)
  *G02F 1/21* (2006.01)
(52) U.S. Cl.
  CPC .............. *G02F 1/225* (2013.01); *G02F 1/035* (2013.01); *G02F 2001/212* (2013.01)
(58) Field of Classification Search
  None
  See application file for complete search history.

(56) References Cited

U.S. PATENT DOCUMENTS

| 5,208,697 | A | * | 5/1993 | Schaffner | G02F 1/2255 359/254 |
| 6,111,474 | A | * | 8/2000 | Nibe | H01Q 1/247 330/66 |
| 7,471,520 | B2 | * | 12/2008 | Schwiebert | H01L 23/66 361/760 |
| 8,712,195 | B2 | * | 4/2014 | Sugiyama | G02F 1/035 333/246 |
| 2003/0030516 | A1 | * | 2/2003 | Tsukiyama | H01L 23/66 333/247 |
| 2004/0120626 | A1 | * | 6/2004 | Kornrumpf | G02F 1/225 385/2 |
| 2012/0051683 | A1 | | 3/2012 | Sugiyama | |

FOREIGN PATENT DOCUMENTS

| JP | 2011-138049 | 7/2011 |
| JP | 2012-048121 | 3/2012 |
| JP | 2012-182409 | 9/2012 |

* cited by examiner

*Primary Examiner* — Sung Pak
(74) *Attorney, Agent, or Firm* — Staas & Halsey LLP

(57) ABSTRACT

An optical module includes an optical modulator that modulates light by using an electrical signal input from a first surface to a plurality of electrodes; and a flexible substrate that has a plurality of wiring patterns electrically connected to the plurality of electrodes, respectively, on the first surface. The optical modulator has a bulging part that bulges out from the first surface opposed to the flexible substrate toward the flexible substrate and is in contact with the flexible substrate.

9 Claims, 8 Drawing Sheets

OPTICAL MODULE AND TRANSMITTING DEVICE

CROSS-REFERENCE TO RELATED APPLICATION

This application is based upon and claims the benefit of priority of the prior Japanese Patent Application No. 2014-121853, filed on Jun. 12, 2014, the entire contents of which are incorporated herein by reference.

FIELD

The embodiments discussed herein are related to an optical module and a transmitting device.

BACKGROUND

Conventionally, a Mach-Zehnder interferometer may be used in an optical modulator that modulates a light generated in a light source. In such an optical modulator, a signal electrode and a ground electrode are installed along parallel optical waveguides. In recent years, there is a variety of optical modulation method; therefore, many optical modulators are equipped with multiple Mach-Zehnder interferometers. In this case, multiple Mach-Zehnder interferometers are integrated on one chip, thereby making it possible to reduce the size of an optical modulator.

An optical modulator equipped with multiple Mach-Zehnder interferometers can generate a multi-level modulation signal when multiple different electrical signals have been input to the optical modulator. That is, different electrical signals are input from the outside to signal electrodes corresponding to the Mach-Zehnder interferometers, respectively, thereby enabling optical modulation by a multi-level modulation method such as DQPSK (Differential Quadrature Phase Shift Keying).

A connector may be installed in an input unit that receives an electrical signal to an optical modulator. However, if connectors are installed with respect to multiple electrical signals, the size of the optical modulator is increased, thereby increasing the mounting area. Accordingly, flexible printed circuits (FPC) having flexibility may be used in the input unit for electrical signal so as to miniaturize the device.

Specifically, multiple wiring patterns corresponding to multiple signal electrodes of an optical modulator are printed on an FPC, and an electrical signal output from a driver is input to the optical modulator through the wiring patterns printed on the FPC. Each wiring pattern is soldered, for example, to an electrode that outputs an electrical signal from the driver, thereby a driver-side end of the FPC is electrically connected to the driver. Furthermore, an end of the FPC on the side of the optical modulator is inserted into a notch part formed on the optical modulator, and is electrically connected to the optical modulator by soldering each wiring pattern, for example, to a coaxial terminal that projects downward from an upper surface of the notch part.

Patent Literature 1: Japanese Laid-open Patent Publication No. 2012-182409

Patent Literature 2: Japanese Laid-open Patent Publication No. 2012-48121

However, the FPC is formed of flexible material; therefore, if multiple wiring patterns are printed on the FPC, and the width of the FPC is increased, the FPC may deform under its own weight. That is, as described above, one end of the FPC is inserted, for example, into the notch part and connected to the optical modulator; however, toward the other end of the FPC, near the center of the FPC in a width direction hangs down to a direction of a substrate under the weight of the FPC, and the other end of the FPC is arched, nearly U-shape in cross-section. Therefore, when the other end of the FPC is soldered to the electrode that outputs an electrical signal from the driver, wiring patterns located at both ends in the width direction and the center wiring pattern are connected to electrodes through solders which differ in thickness. Consequently, there is a problem that it is difficult to achieve impedance matching equally in the wiring patterns.

An electrical signal supplied from the driver to the optical modulator is a high-frequency signal; therefore, if there is an impedance mismatch, an S11 parameter, which indicates reflection in an input port of the FPC, deteriorates. Then, power gain is reduced by loss due to reflection, resulting in degradation of electrical signal waveform. Furthermore, the amplitude of an electrical signal input to the optical modulator is reduced, so, to compensate for the reduction in amplitude, output of the driver is increased, and power consumption is increased.

SUMMARY

According to an aspect of an embodiment, an optical module includes an optical modulator that modulates light by using an electrical signal input from a first surface to a plurality of electrodes, and a flexible substrate that has a plurality of wiring patterns electrically connected to the plurality of electrodes, respectively, on the first surface. The optical modulator has a bulging part that bulges out from the first surface opposed to the flexible substrate toward the flexible substrate and is in contact with the flexible substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Incidentally, the present invention is not limited to the embodiments.

[a] First Embodiment

Figure 1:
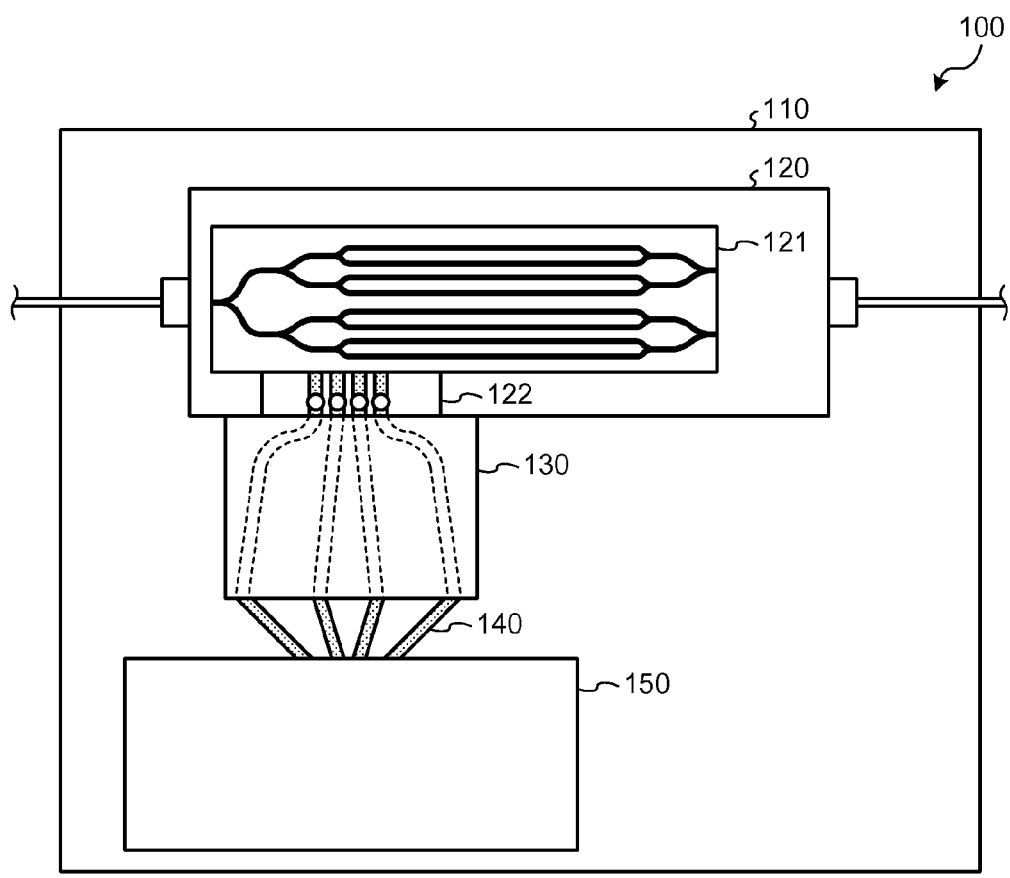
FIG. 1 is a schematic plan view illustrating a configuration of an optical module according to a first embodiment.

FIG. 1 is a schematic plan view illustrating a configuration of an optical module 100 according to a first embodiment. The optical module 100 illustrated in FIG. 1 includes a printed circuits board (PCB) 110, an optical modulator 120, an FPC 130, an electrode 140, and a driver 150.

The PCB 110 is, for example, a glass epoxy board or the like, and mounts thereon various components composing the optical module 100.

The optical modulator 120 modulates a light generated in a light source (not illustrated) and outputs the modulated light. At this time, the optical modulator 120 performs the light modulation on the basis of an electrical signal output from the driver 150. Specifically, the optical modulator 120 includes a modulator chip 121 and a relay substrate 122.

The modulator chip 121 is composed of parallel optical waveguides, signal electrodes, and ground electrodes; while propagating light from the light source through the optical waveguides, the modulator chip 121 performs light modulation based on an electrical signal supplied to the signal electrodes. Specifically, the optical waveguides are formed by forming a metal film, such as a titanium (Ti) film, on part of a crystal substrate which uses electro-optic crystal, such as lithium niobate ($LiNbO_3$ (LN)) or lithium tantalate ($LiTaO_2$), and performing thermal diffusion. Alternatively, the optical waveguides can be formed by proton exchange in benzoic acid after patterning. On the other hand, the signal electrodes and the ground electrodes are coplanar electrodes formed along parallel optical waveguides. In FIG. 1, four pairs of parallel optical waveguides are formed in the modulator chip 121; therefore, the signal electrodes and ground electrodes corresponding to the respective pairs of optical waveguides are formed. The signal electrodes and ground electrodes are, for example, patterned on the optical waveguides. Then, to prevent the light propagating through the optical waveguides from being absorbed by the signal electrodes and ground electrodes, a buffer layer is provided between the crystal substrate and the signal electrodes and ground electrodes. As the buffer layer, for example, silicon dioxide ($SiO_2$) having a thickness of about 0.2 to 2 µm can be used.

The relay substrate 122 relays an electrical signal output from the driver 150 to the modulator chip 121, and inputs the electrical signal to the signal electrodes of the modulator chip 121. In FIG. 1, the relay substrate 122 has four wiring patterns corresponding to the four signal electrodes formed on the modulator chip 121. When an electrical signal is input to a plurality of signal electrodes formed on the modulator chip 121, if all input units for electrical signal are arranged on one side of the optical modulator 120, it is easy of mounting, and the mounting area can be small. Therefore, in the present embodiment, it is configured that the relay substrate 122 is placed in the optical modulator 120 so that the relay substrate 122 relays an electrical signal input from one side of the optical modulator 120 to the modulator chip 121.

The FPC 130 is a flexible substrate having flexibility, and supplies an electrical signal output from the driver 150 to the optical modulator 120. That is, one end of the FPC 130 is electrically connected to the relay substrate 122 of the optical modulator 120, and the other end of the FPC 130 is electrically connected to the driver 150. On a surface of the FPC 130 on the side of the PCB 110, a wiring pattern for propagating an electrical signal is formed. In the present embodiment, four wiring patterns connected to the four wiring patterns that the relay substrate 122 has are formed on the FPC 130. These wiring patterns are subject to pitch conversion on the FPC 130; the pitch between the wiring patterns is large on the side of the driver 150 and small on the side of the optical modulator 120. The pitch between the wiring patterns is enlarged on the side of the driver 150 in this way, thereby the workability in soldering is improved, and crosstalk between the wiring patterns can be reduced.

The electrode 140 is electrodes printed on the PCB 110, and propagates an electrical signal output from the driver 150 to the FPC 130. The electrode 140 and the wiring patterns of the FPC 130 are soldered.

The driver 150 generates an electrical signal for modulating light from the light source. That is, the driver 150 generates a high-frequency electrical signal having amplitude/phase according to transmit data, and drives the optical modulator 120 by this electrical signal.

Figure 2:
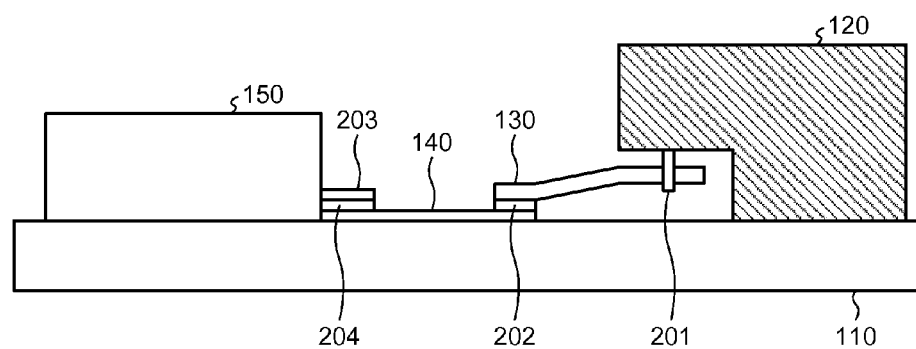
FIG. 2 is a schematic side view illustrating the configuration of the optical module according to the first embodiment.

Subsequently, the electrical connection between the optical modulator 120, the FPC 130 and the driver 150 is explained with reference to FIG. 2. FIG. 2 is a schematic side view illustrating the configuration of the optical module 100 according to the first embodiment.

As illustrated in FIG. 2, a notch is formed on a part of the optical modulator 120 near the PCB 110, and one end of the FPC 130 is inserted into the notch part formed on the optical modulator 120 and is connected to the optical modulator 120 within the notch part. That is, a coaxial terminal 201 projecting downward from an upper surface of the notch part and the wiring patterns of the FPC 130 are soldered, thereby the FPC 130 and the optical modulator 120 are electrically connected.

Furthermore, the other end of the FPC 130 on the side of the driver 150 is soldered to the electrode 140. That is, the wiring patterns of the FPC 130 and the electrode 140 are electrically connected by a solder 202. As will be described later, in the present embodiment, the end of the FPC 130 on the side of the driver 150 is not warped and is parallel to the surface of the PCB 110; therefore, the thickness of the solder 202 between the wiring patterns of the FPC 130 and the electrode 140 is uniform. Therefore, it is possible to achieve impedance matching equally in the wiring patterns.

A lead pin 203 projecting from the driver 150 is soldered to the electrode 140, thereby the driver 150 and the electrode 140 are electrically connected. That is, the lead pin 203 of the driver 150 is connected to the electrode 140 via a solder 204.

Figure 3:
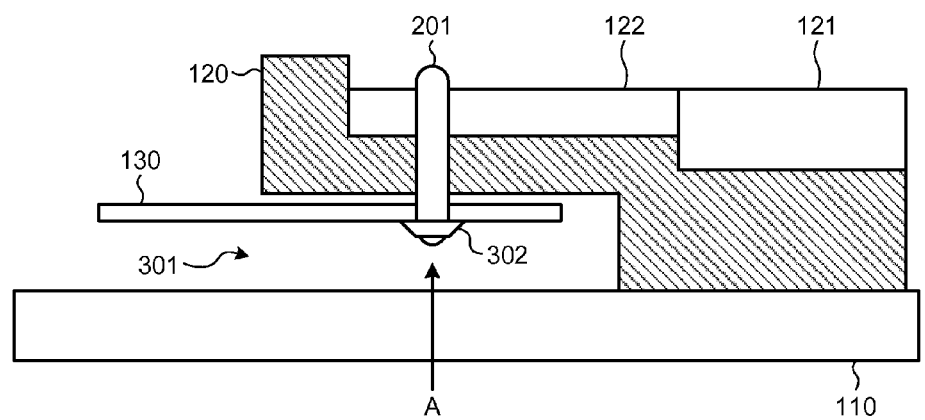
FIG. 3 is a diagram illustrating a configuration of connection between an optical modulator and an FPC.

Subsequently, connection between the optical modulator 120 and the FPC 130 is explained in detail. FIG. 3 is a diagram illustrating a configuration of the connection between the optical modulator 120 and the FPC 130. As illustrated in FIG. 3, a notch part 301 is formed on a part of the optical modulator 120 near the PCB 110. Then, one end of the FPC 130 is inserted into the notch part 301, and the wiring patterns of the FPC 130 are soldered to the coaxial terminal 201.

The coaxial terminal 201 pierces through the relay substrate 122 in the optical modulator 120 and the upper surface of the notch part 301, and projects downward from the optical modulator 120. Then, the coaxial terminal 201 further penetrates through a through-hole formed on the FPC 130, and, on the surface of the FPC 130 on the side of the PCB 110, is connected to the wiring patterns by a solder 302. Accordingly, the optical modulator 120 and the FPC 130 are electrically connected. In this way, one end of the FPC 130 provided with a plurality of wiring patterns is inserted into the notch part 301 formed in the lower part of the optical modulator 120 and is connected to the optical modulator 120; therefore, the length of the FPC 130 connecting between the optical modulator 120 and the driver 150 can be minimized. Furthermore, the coaxial terminal 201 projecting downward from the upper surface of the notch part 301 and the plurality of wiring patterns of the FPC 130 are soldered; therefore, no connector, etc. is needed, and the mounting area in the optical modulator 120 can be made small.

Figure 4:
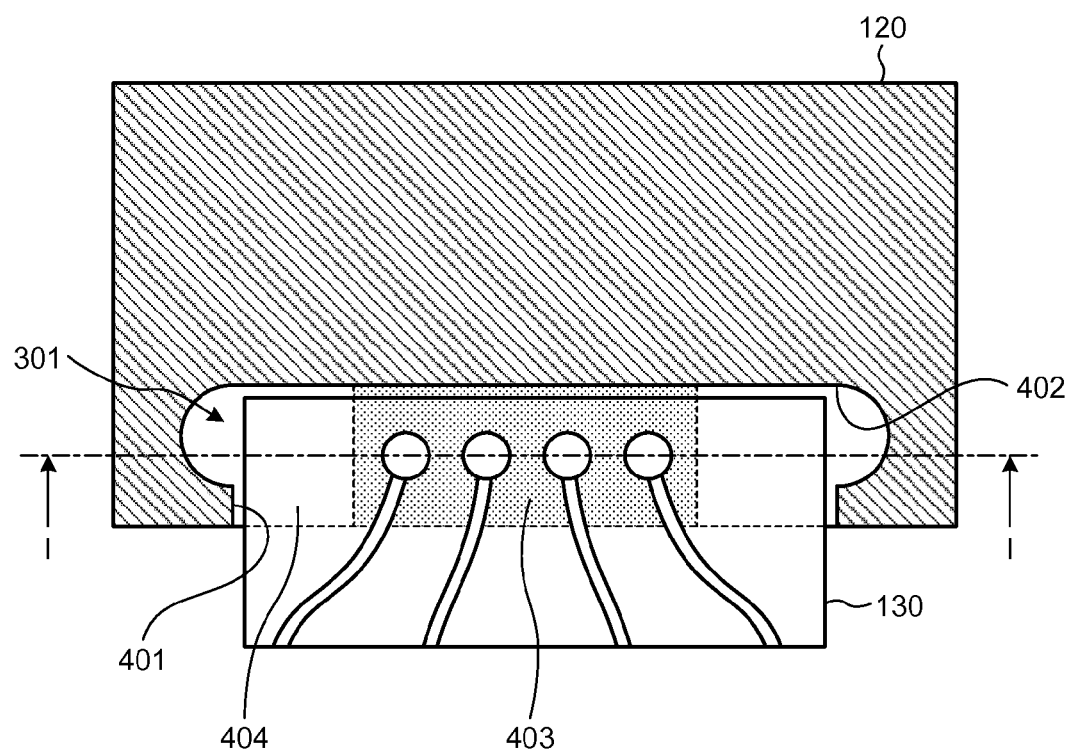
FIG. 4 is a diagram illustrating a configuration of a notch part according to the first embodiment.

FIG. 4 is a diagram illustrating a configuration of the notch part 301 viewed from direction A in FIG. 3. As illustrated in FIG. 4, the notch part 301 has side surfaces 401 and an abutting surface 402 on the periphery thereof; the side surfaces 401 are for defining the position of the FPC 130 in the width direction, and the abutting surface 402 is for defining the position of the FPC 130 in a length direction. That is, the notch part 301 has the side surfaces 401 opposed at a distance corresponding to the width of the FPC 130 in the entrance thereof into which the FPC 130 is inserted, and positions the FPC 130 in the width direction when the FPC 130 is inserted into the notch part 301. Furthermore, when the FPC 130 has been inserted into the notch part 301 and the leading end of the FPC 130 has come into contact with the abutting surface 402, the position of the coaxial terminal 201 and the position of the through-hole of the FPC 130 overlap each other. As the FPC 130 is positioned by the side surfaces 401 and the abutting surface 402 in this way, the coaxial terminal 201 can be easily passed through the through-hole of the FPC 130.

Furthermore, a step difference is formed on the upper surface of the notch part 301. That is, bulging surfaces 404, which bulge toward the FPC 130, are formed on both sides of a surface 403 opposed to the central part of the FPC 130 in the width direction. The bulging surfaces 404 are in contact with the FPC 130 on the both sides of the central part thereof formed with the plurality of wiring patterns, and push down the both ends of the FPC 130 in the width direction toward the PCB 110. Consequently, even on one end of the FPC 130 connected to the electrode 140, the central part of the FPC 130 in the width direction does not hang down toward the PCB 110. Therefore, it is possible to make the thickness of the solder 202 between the wiring patterns of the FPC 130 and the electrode 140 uniform.

Figure 5:
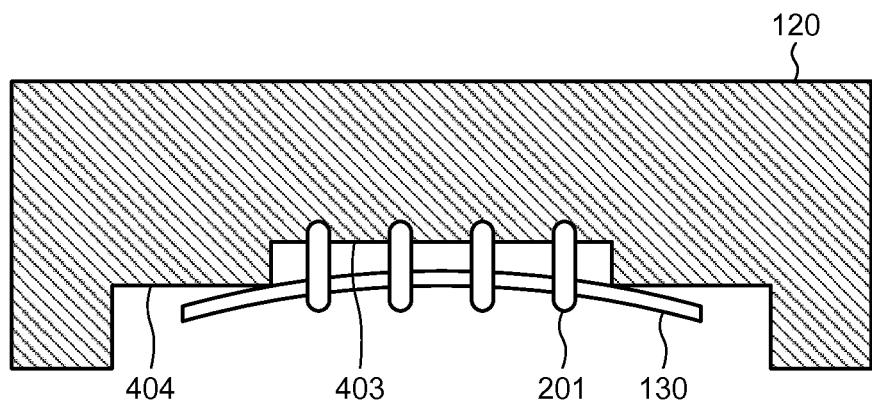
FIG. 5 is a diagram illustrating a cross-section along the line I-I in FIG. 4.

FIG. 5 is a diagram illustrating a cross-section along the line I-I in FIG. 4. As illustrated in FIG. 5, the coaxial terminals 201 projecting from the surface 403 penetrates through the through-holes of the FPC 130 and are soldered to the FPC 130, thereby the FPC 130 is fixed to the optical modulator 120. Then, the bulging surfaces 404 are in contact with both sides of the FPC 130 across the central part of the FPC 130 in the width direction, and push down the both ends of the FPC 130. Accordingly, on one end connected to the optical modulator 120, the FPC 130 takes an inverted U-shape. Even when the both ends of the FPC 130 in the width direction are deformed by the bulging surfaces 404 in this way, the coaxial terminals 201 and the FPC 130 are fixed by soldering, so the distance between surface 403 and the FPC 130 is fixed. Therefore, the distance to the relay substrate 122 does not differ among the wiring patterns of the FPC 130, and the impedance does not differ among the wiring patterns.

Figure 6:
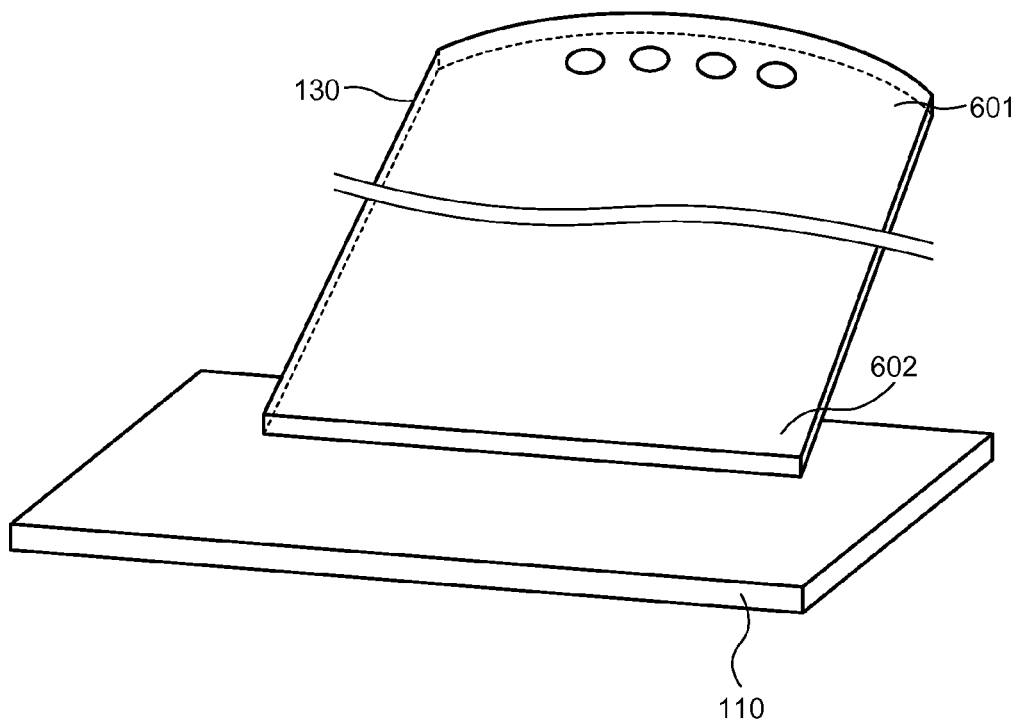
FIG. 6 is a diagram illustrating the shape of the FPC according to the first embodiment.

Then, as illustrated in FIG. 6, one end 601 of the FPC 130 connected to the optical modulator 120 takes an inverted U-shape, thereby the other end 602 connected to the electrode 140 on the PCB 110 becomes parallel to the surface of the PCB 110. That is, on the end 602 of the FPC 130, the distance between the plurality of wiring patterns and the surface of the PCB 110 is equal, and, when the wiring patterns are soldered to the electrode 140, solders for all the wiring patterns can be uniform in thickness. Consequently, the impedance does not differ among the wiring patterns, and the characteristic impedance can be easily set to 50Ω as to all the wiring patterns, i.e., it is possible to achieve impedance matching.

As described above, according to the present embodiment, bulging surfaces are formed on the upper surface of a notch part formed in the lower part of an optical modulator, thereby pushing down both width-directional ends of an FPC inserted into the notch part toward a PCB. Therefore, even on one end of the FPC connected to a driver, the central part of the FPC in the width direction does not hang down toward the PCB, and the distance between wiring patterns and the surface of the PCB can be kept equal. Consequently, it is possible to make the thickness of solders connecting between the wiring patterns and an electrode on the PCB uniform, and it is possible to achieve impedance matching equally in the wiring patterns.

[b] Second Embodiment

Features of a second embodiment are that a projection is provided on an upper surface of a notch part formed in an optical modulator, and both ends of an FPC in the width direction are pushed down by the projection.

The optical module 100 according to the second embodiment has the same configuration as that in the first embodiment, so description is omitted. The second embodiment differs from the first embodiment in the shape of the notch part 301 formed in the lower part of the optical modulator 120.

Figure 7:
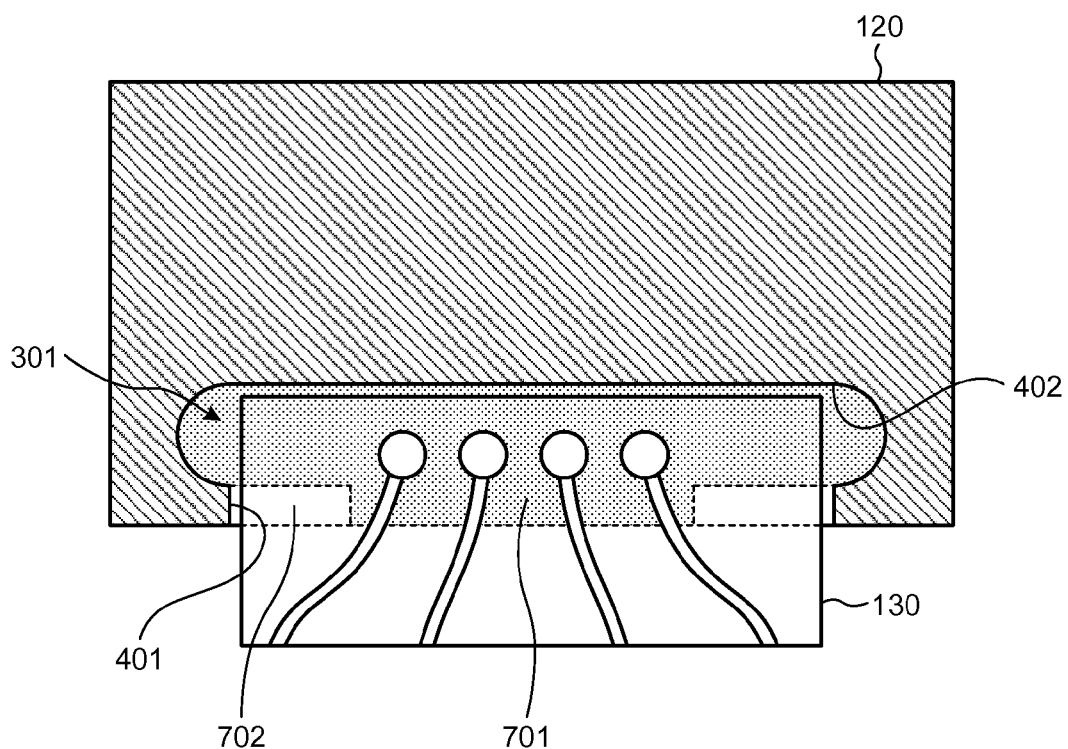
FIG. 7 is a diagram illustrating a configuration of a notch part according to a second embodiment.

FIG. 7 is a diagram illustrating a configuration of the notch part 301 according to the second embodiment. In FIG. 7, the same component as in FIGS. 1 to 4 shall be assigned the same reference numeral. Furthermore, FIG. 7 illustrates the configuration of the notch part 301 viewed from the direction A in FIG. 3.

As illustrated in FIG. 7, a projection 702 of which the portions adjacent to the side surfaces 401 bulge toward the FPC 130 is provided on an upper surface 701 of the notch part 301. The projection 702 is in contact with the FPC 130 on the both sides of an area formed with a plurality of wiring patterns, and pushes down the both ends of the FPC 130 in the width direction toward the PCB 110. Consequently, even on one end of the FPC 130 connected to the electrode 140, the central part of the FPC 130 in the width direction does not hang down toward the PCB 110. Therefore, it is possible to make the thickness of the solder 202 between the wiring patterns of the FPC 130 and the electrode 140 uniform.

Furthermore, in the present embodiment, the projection 702 is provided adjacent to the side surfaces 401 of the notch part 301. In other words, the projection 702 does not exist near the through-hole of the FPC 130 through which the coaxial terminals 201 penetrates, and the projection 702 pushes down the both ends of the FPC 130 in the width direction near the entrance of the notch part 301 into which the FPC 130 is inserted. Therefore, it is possible to suppress deformation of the FPC 130 near the connection between the coaxial terminals 201 and the wiring patterns of the FPC 130, and therefore it is possible to prevent a bad electrical contact between the coaxial terminals 201 and the wiring patterns.

As described above, according to the present embodiment, a projection is provided on an upper surface of a notch part formed in the lower part of an optical modulator, thereby pushing down both width-directional ends of an FPC inserted into the notch part toward a PCB. Therefore, even on one end of the FPC connected to a driver, the central part of the FPC in the width direction does not hang down toward the PCB, and the distance between wiring patterns and the surface of the PCB can be kept equal. Consequently, it is possible to make the thickness of solders connecting between the wiring patterns and an electrode on the PCB uniform, and it is possible to achieve impedance matching equally in the wiring patterns.

Furthermore, the projection pushes down the both ends of the FPC in the width direction at the position away from the connection between the optical modulator and the wiring patterns; therefore, it is possible to suppress deformation of the FPC near the connection and also possible to prevent a bad electrical contact between the optical modulator and the wiring patterns.

[c] Third Embodiment

Features of a third embodiment are that a projection is provided on an upper surface of a notch part formed in an optical modulator, and also a wide portion is provided on an FPC, and a part for pushing down both ends of the FPC in the width direction and a part for positioning of the FPC are arranged to be kept away from each other.

The optical module 100 according to the third embodiment has the same configuration as that in the first embodiment, so description is omitted. The third embodiment differs from the first embodiment in the shape of the notch part 301 formed in the lower part of the optical modulator 120 and the shape of the FPC 130.

Figure 8:
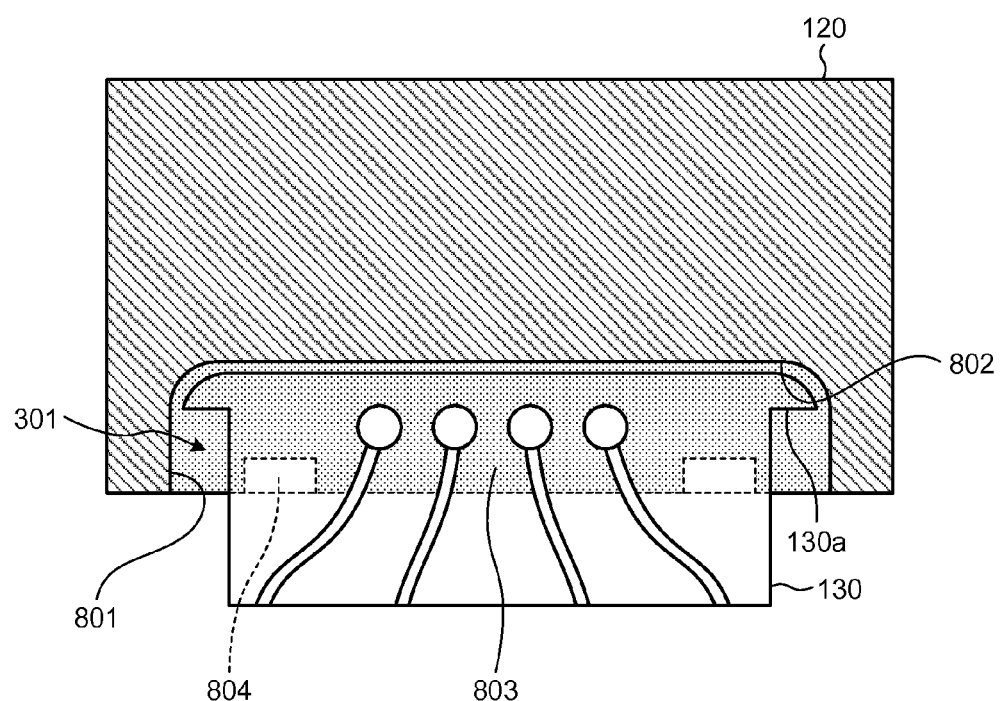
FIG. 8 is a diagram illustrating a configuration of a notch part according to a third embodiment.

FIG. 8 is a diagram illustrating a configuration of the notch part 301 according to the third embodiment. In FIG. 8, the same component as in FIGS. 1 to 4 shall be assigned the same reference numeral. Furthermore, FIG. 8 illustrates the configuration of the notch part 301 viewed from the direction A in FIG. 3.

As illustrated in FIG. 8, the FPC 130 according to the third embodiment has a wide portion 130a on the leading end thereof inserted into the notch part 301. Then, the notch part 301 has side surfaces 801 opposed at a distance corresponding to the width of the wide portion 130a of the FPC 130 in the entrance thereof into which the FPC 130 is inserted, and positions the FPC 130 in the width direction when the FPC 130 is inserted into the notch part 301 from the wide portion 130a thereof. Furthermore, when the FPC 130 has been inserted into the notch part 301 and the tip of the wide portion 130a has come into contact with an abutting surface 802, the position of the coaxial terminal 201 and the position of the through-hole of the FPC 130 overlap each other. As the FPC 130 is positioned by the wide portion 130a provided in the leading end of the FPC 130 and the side surfaces 801 and abutting surface 802 of the notch part 301 in this way, the coaxial terminal 201 can be easily passed through the through-hole of the FPC 130.

Furthermore, a projection 804 of which the portions away from the side surfaces 801 and the abutting surface 802 bulge toward the FPC 130 is provided on an upper surface 803 of the notch part 301. The projection 804 is in contact with the FPC 130 on the both sides of an area formed with a plurality of wiring patterns, and pushes down the both ends of the FPC 130 in the width direction toward the PCB 110. Consequently, even on one end of the FPC 130 connected to the electrode 140, the central part of the FPC 130 in the width direction does not hang down toward the PCB 110. Therefore, it is possible to make the thickness of the solder 202 between the wiring patterns of the FPC 130 and the electrode 140 uniform.

Furthermore, in the present embodiment, the projection 804 is provided in the position away from the side surfaces 801 and the abutting surface 802 that position the FPC 130. Therefore, when the external form of the optical modulator 120 is processed, a part for positioning of the FPC 130 requiring dimensional accuracy and a part for pushing down the both ends of the FPC 130 in the width direction can be processed independently. That is, it is possible to improve the work efficiency when the notch part 301 is formed in the optical modulator 120.

As described above, according to the present embodiment, a projection is provided on an upper surface of a notch part formed in the lower part of an optical modulator, thereby pushing down both width-directional ends of an FPC inserted into the notch part toward a PCB. Therefore, even on one end of the FPC connected to a driver, the central part of the FPC in the width direction does not hang down toward the PCB, and the distance between wiring patterns and the surface of the PCB can be kept equal. Consequently, it is possible to make the thickness of solders connecting between the wiring patterns and an electrode on the PCB uniform, and it is possible to achieve impedance matching equally in the wiring patterns.

Furthermore, the projection is provided in the position away from a part for positioning of the FPC; therefore, the part for the positioning required to reduce a dimension error and the projection can be processed independently, and the work efficiency at the time of manufacture of the optical modulator can be enhanced.

Incidentally, in the above embodiments, one end of the FPC 130 is inserted into the notch part 301 of the optical modulator 120, and the FPC 130 and the optical modulator 120 are connected on the upper surface of the notch part 301. However, a notch part does not always have to be formed on the optical modulator 120. That is, when the entire optical modulator 120 is supported, for example, by a supporting member in a manner suspended from the PCB 110, the FPC 130 can be inserted between the PCB 110 and the optical modulator 120, and the FPC 130 and the optical modulator 120 can be connected on the undersurface of the optical modulator 120. Furthermore, the FPC 130 and the optical modulator 120 can be connected on the side surface or upper surface of the optical modulator 120 as well.

Figure 9:
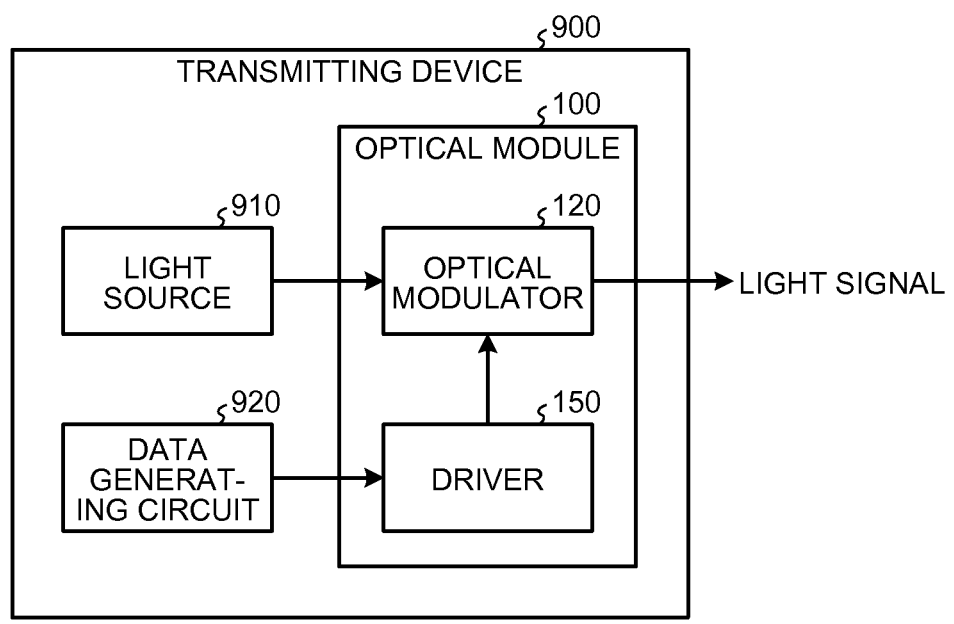
FIG. 9 is a block diagram illustrating a configuration example of a transmitting device.

The optical modules 100 discussed in the above embodiments can be installed, for example, in a transmitting device for transmitting an optical signal. FIG. 9 is a block diagram illustrating a configuration example of such a transmitting device 900. As illustrated in FIG. 9, the transmitting device 900 includes the optical module 100, a light source 910, and a data generating circuit 920.

The light source 910 includes, for example, a laser diode (LD), and generates light. Then, the light generated in the light source 910 is input to the optical modulator 120 in the optical module 100.

The data generating circuit 920 generates transmit data. The transmit data is input to the driver 150 in the optical module 100, and an electrical signal with a waveform according to the transmit data is generated by the driver 150. Then, the electrical signal is supplied from the driver 150 to the optical modulator 120, and the optical modulator 120 performs light modulation based on the electrical signal. Then, an optical signal obtained through the light modulation by the optical modulator 120 is transmitted, for example, via an optical fiber.

Here, as explained in the above embodiments, the optical modulator 120 and the driver 150 are connected by the FPC 130 having a plurality of wiring patterns, and the impedance equally matches in the wiring patterns. Therefore, degradation of a waveform of an electrical signal supplied from the driver 150 to the optical modulator 120 is suppressed, so the transmitting device 900 can transmit the transmit data with high accuracy.

According to one aspect of an optical module discussed in the embodiments, even when multiple wiring patterns are formed on a flexible substrate connected to an optical modulator, it is possible to achieve impedance matching equally in the wiring patterns.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
   an optical modulator that modulates light by using an electrical signal input from a first surface to a plurality of electrodes; and
   a flexible substrate that has a plurality of wiring patterns electrically connected to the plurality of electrodes, respectively, on the first surface, wherein
   the optical modulator has a bulging part that bulges out from the first surface opposed to the flexible substrate toward the flexible substrate and that is in contact with the flexible substrate.
2. The optical module according to claim 1, wherein
   the bulging part bulges out relative to an area of the first surface opposed to a central part of the flexible substrate in width direction toward the flexible substrate, and is in contact with both sides of the flexible substrate across the central part of the flexible substrate in the width direction.
3. The optical module according to claim 2, wherein
   the flexible substrate has the plurality of wiring patterns on the central part which has no contact with the bulging part.
4. The optical module according to claim 2, wherein
   the flexible substrate has the plurality of wiring patterns whose pitch is larger on one end than the other end connected to the plurality of electrodes.
5. The optical module according to claim 2, wherein
   the optical modulator has a notch part formed by cutting off a portion of an external form, and
   one end of the flexible substrate is inserted into the notch part of the optical modulator, and the flexible substrate has the plurality of wiring patterns electrically connected the plurality of electrodes, respectively, on the first surface forming the notch part.
6. The optical module according to claim 5, wherein
   the notch part has a pair of second surfaces that stand up from the first surface and are opposed at a distance corresponding to the width of the flexible substrate, and
   the bulging part is provided at a position adjacent to the second surfaces.
7. The optical module according to claim 5, wherein
   the flexible substrate has a wide portion which is wider than other portions on one end inserted into the notch part,
   the notch part has a pair of second surfaces that stand up from the first surface and are opposed at a distance corresponding to a width of the wide portion of the flexible substrate, and
   the bulging part is provided at a position away from to the second surfaces.
8. A transmitting device comprising:
   a light source that generates light;
   an optical modulator that modulates the light generated in the light source by using an electrical signal input from a first surface to a plurality of electrodes;
   a driver that generates an electrical signal corresponding to transmit data; and
   a flexible substrate that has a plurality of wiring patterns electrically connected to the plurality of electrodes, respectively, on the first surface, and inputs the electrical signal generated by the driver to the optical modulator through the plurality of wiring patterns, wherein
   the optical modulator has a bulging part that bulges out from the first surface opposed to the flexible substrate toward the flexible substrate and that is in contact with the flexible substrate.
9. The optical module according to claim 1, wherein
   the bulging part bulges out relative to an area of the first surface from which the plurality of electrodes project towards the flexible substrate.

* * * * *